United States Patent
Andros

(10) Patent No.: US 9,237,688 B2
(45) Date of Patent: Jan. 19, 2016

(54) ROOT ROPE FOR PLANTING PLANT ROOT MATERIAL, AND METHOD OF USE

(75) Inventor: Matthew James Andros, Santa Margarita, CA (US)

(73) Assignee: Plant Sciences, Inc., Watsonville, CA (US)

(*) Notice: Subject to any disclaimer, the term of this patent is extended or adjusted under 35 U.S.C. 154(b) by 692 days.

(21) Appl. No.: 13/419,379

(22) Filed: Mar. 13, 2012

(65) Prior Publication Data

US 2012/0255473 A1 Oct. 11, 2012

Related U.S. Application Data

(60) Provisional application No. 61/472,590, filed on Apr. 6, 2011.

(51) Int. Cl.
*A01C 14/00* (2006.01)
*A01C 1/04* (2006.01)
*D07B 3/02* (2006.01)
*D07B 5/02* (2006.01)
*B65H 54/12* (2006.01)
*B65H 54/28* (2006.01)

(52) U.S. Cl.
CPC .............. *A01C 14/00* (2013.01); *A01C 1/042* (2013.01); *B65H 54/12* (2013.01); *B65H 54/28* (2013.01); *D07B 3/02* (2013.01); *D07B 5/02* (2013.01); *B65H 2701/35* (2013.01); *D07B 2501/2038* (2013.01)

(58) Field of Classification Search
CPC ........... A01C 1/042; A01C 14/00; D07B 5/02
USPC ................................. 57/3, 6, 10, 13, 210, 230
See application file for complete search history.

(56) References Cited

U.S. PATENT DOCUMENTS

| | | | | |
|---|---|---|---|---|
| 47,343 A * | 4/1865 | Sperry | ............................... | 57/13 |
| 634,050 A * | 10/1899 | Wittbold | ............................. | 57/4 |
| 2,248,123 A * | 7/1941 | Sackner | ............................... | 57/7 |
| 2,856,845 A * | 10/1958 | Beyette | ........................... | 100/13 |
| 2,974,457 A * | 3/1961 | Saxton | ............................ | 100/13 |
| 3,221,875 A * | 12/1965 | Paquette | ........................... | 342/12 |
| 3,375,607 A * | 4/1968 | Melvold | ............................. | 47/74 |
| 3,416,434 A * | 12/1968 | Woserau et al. | .............. | 100/144 |
| 3,445,985 A * | 5/1969 | Manetta | ........................... | 53/530 |
| 3,473,291 A * | 10/1969 | Raymond et al. | ............... | 53/530 |
| 3,507,137 A * | 4/1970 | Robinson et al. | ............... | 72/148 |
| 3,541,979 A * | 11/1970 | Lorenzen | ........................ | 111/100 |
| 3,559,390 A * | 2/1971 | Staschewski | ........................ | 57/6 |
| 3,709,263 A * | 1/1973 | Jackson et al. | ............ | 139/420 R |
| 3,722,139 A * | 3/1973 | Pelton | ......................... | 47/58.1 R |
| 3,727,390 A * | 4/1973 | Schwarz | ............................ | 57/13 |
| 3,934,395 A * | 1/1976 | Vryland | ............................ | 57/13 |
| 4,277,885 A * | 7/1981 | Scudder | ........................... | 29/780 |

(Continued)

FOREIGN PATENT DOCUMENTS

DE 3310037 9/1984
DE 10251985 A1 * 5/2004 ............ A01C 11/00

*Primary Examiner* — Shaun R Hurley
(74) *Attorney, Agent, or Firm* — R. Scott Kimsey; Klein, DeNatale, Goldner et al.

(57) ABSTRACT

A method for using a root rope for planting root material includes disposing onto a bed of soil a root rope. The root rope includes root material, a carrier line onto which the root material is disposed, and wrapping material wrapped around the root material and the carrier line to secure the root material to the carrier line, forming an elongate rope.

1 Claim, 15 Drawing Sheets

(56) References Cited

U.S. PATENT DOCUMENTS

| | | | |
|---|---|---|---|
| 4,461,429 A * | 7/1984 | Goekler et al. | 242/439.5 |
| 4,463,547 A * | 8/1984 | Young | 57/6 |
| PP7,644 P * | 9/1991 | Lounsbury et al. | Plt./205 |
| 5,330,608 A * | 7/1994 | Kemmler et al. | 156/361 |
| 5,421,140 A * | 6/1995 | Theriault | 53/530 |
| 5,487,941 A * | 1/1996 | Pepin | 428/364 |
| 5,523,331 A * | 6/1996 | Ezoe | 524/25 |
| 5,979,288 A * | 11/1999 | Gallagher et al. | 87/36 |
| 6,123,654 A * | 9/2000 | LaFleur | 493/217 |
| 6,260,342 B1 * | 7/2001 | Lehman | 57/3 |
| 6,490,852 B1 * | 12/2002 | Mustacich et al. | 57/3 |
| 6,519,924 B1 * | 2/2003 | Barz | 57/18 |
| 6,789,380 B2 * | 9/2004 | Mellott et al. | 57/10 |
| 6,945,026 B1 * | 9/2005 | Hanna | 57/3 |
| 7,520,120 B2 * | 4/2009 | Saito et al. | 57/10 |
| 7,571,594 B2 * | 8/2009 | Pascoe et al. | 57/6 |
| 7,934,366 B2 * | 5/2011 | Dye et al. | 57/6 |
| 2003/0074878 A1 * | 4/2003 | Mellott | 57/10 |
| 2006/0107644 A1 * | 5/2006 | Dye et al. | 57/13 |
| 2008/0022650 A1 * | 1/2008 | Pascoe et al. | 57/6 |
| 2008/0155897 A1 * | 7/2008 | Van de Wetering et al. | 47/74 |
| 2009/0272570 A1 * | 11/2009 | Chen | 174/350 |
| 2010/0325951 A1 * | 12/2010 | Molina | 47/65.5 |

* cited by examiner

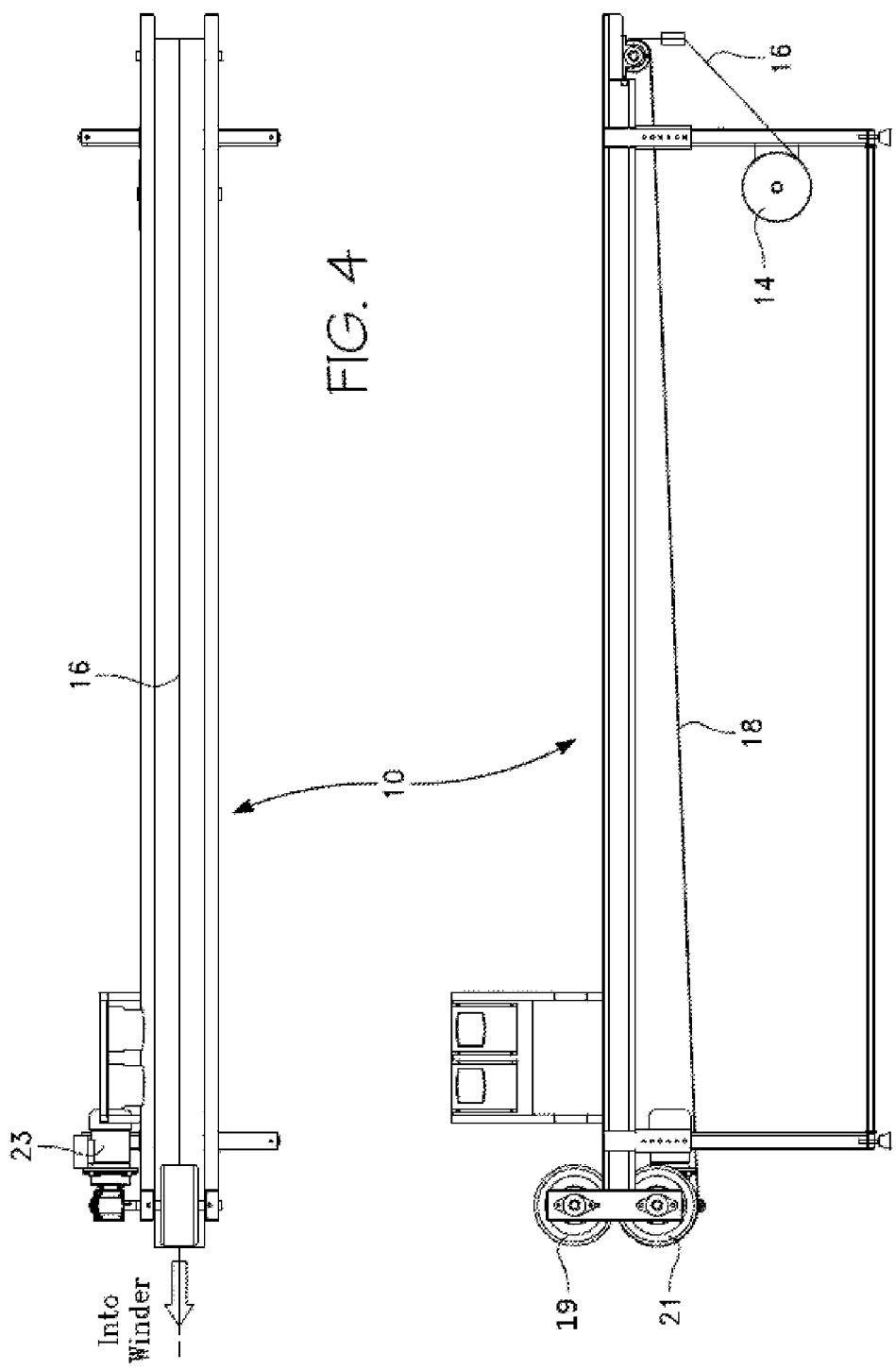

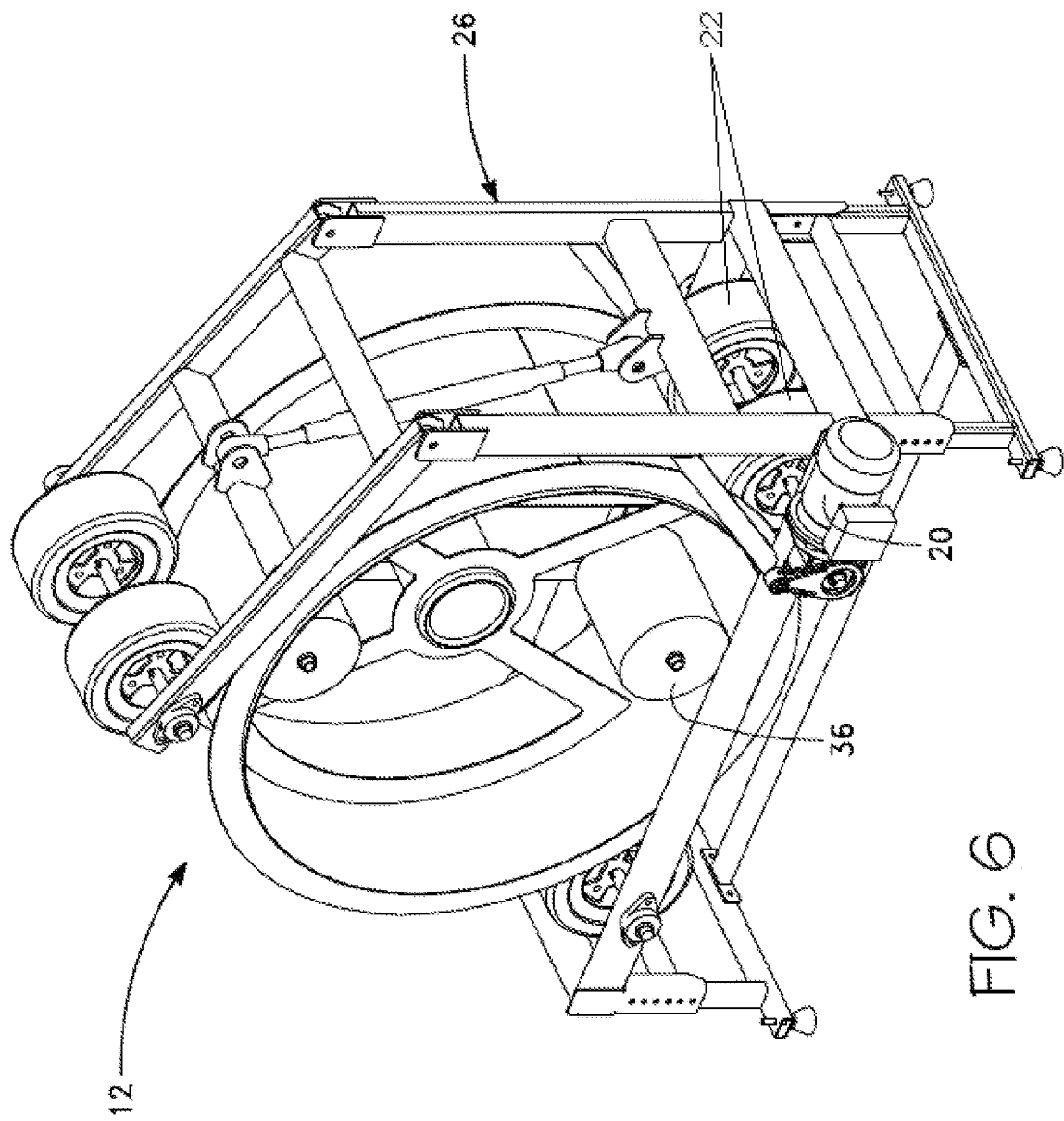

400# ROOT ROPE FOR PLANTING PLANT ROOT MATERIAL, AND METHOD OF USE

RELATED APPLICATIONS

This Application claims priority of U.S. Provisional Patent Application No. 61/472,590, filed on Apr. 6, 2011, and entitled "Method and Apparatus for Planting Raspberries, Blackberries, and other plants in the *Rubus* Genus," which is incorporated herein by reference in its entirety.

BACKGROUND OF THE INVENTION

The present invention relates generally to a method of planting, and more specifically to a method of planting root material from suckering or runner-producing plants, for example, plants of the genus *Rubus*.

The disclosed method and apparatus relates generally to the planting of raspberry, blackberry and other species and hybrids in the *Rubus* genus, as well as asparagus, strawberries, or other suitable plants, and more specifically to methods of planting suckering plants, or plants producing runners, where the plant develops from planting of root material, as opposed to seeds, whole plants, or other planting methods. While the present invention has application to other species and hybrids, particularly in the *Rubus* genus, but among other suckering plants, as well as those producing runners, because of the broad application of the present application to raspberries in particular, the term "raspberries" will be used in this disclosure with the understanding that the claimed method and apparatus are applicable to those other plants, species and hybrids, notwithstanding the specific reference to raspberries.

Raspberries are a small-fruit crop produced by large and small scale farming operations. Initial investment for raspberry farming is high, primarily a result of the costs associated with land preparation, planting, and installation of trellis and irrigation systems. Raspberry cultivars readily produce new shoots from the roots, in a planting process called "suckering." New plantings are established by taking advantage of the plants' ability to produce these suckers. As the plants go dormant in the fall they are harvested and the harvested roots are used to produce subsequent plantings. Future planting can be established using the roots only or by using a complete plant consisting of the roots, the crown and a portion of a stem. In either style of planting, (root only or root, crown & stem), large amounts of hand labor are expended to sort, clean, package, warehouse and replant the root material. Of these, the planting process consumes the largest amount of labor.

The current state of the art for replanting raspberry roots consists of the following operations: (1) preparing the harvested crop for cold storage; (2) cleaning, sorting and packaging; and (3) prior to planting, preparing the fields to receive the roots. This last step involves multiple operations using specialized ground-working equipment to create a defined bed top with longitudinal grooves in the surface of the bed-top. These grooves are designed to receive the root plantings.

Once the bed has been prepared, the plants are removed from cold storage and transported to the field immediately prior to planting. The roots are unpacked and weighed into totes that are then placed along the bed top at spacings which will yield the desired plant density. Laborers then separate the bunches of roots and lay them by hand into the grooves atop the bed. Finally, specialized ground-working equipment is used to cover the roots with an even layer of soil. It should be mentioned that the previously described process is more art than science. Many variables can affect the quality and success of the finished plantings, such as soil and weather conditions, and the availability of skilled laborers to perform the planting and tractor work. A few acres planted in this fashion create a stressful fast paced operation that must be overseen by a skilled supervisor to insure that the work is done correctly. Large plantings of 100 acres or greater are even more problematic and are labor intensive undertakings. Management, logistical and labor costs are extremely high, cumulatively requiring 100+ man-hours per acre planted.

In another aspect of the invention, the root material is derived from suckering plants, plants producing runners, or a combination of the two.

In another aspect of the invention, the root material is taken from raspberries, strawberries, asparagus, or combinations of these.

SUMMARY OF THE INVENTION

One aspect of the present invention provides a method for planting root material. The method includes the step of disposing onto a bed of soil a root rope that includes wrapping material wrapped around root material to form an elongate rope of root material.

In another aspect of the invention, the root rope includes a carrier line onto which root material has been disposed. The wrapping material wraps around the carrier line and the root material, securing the root material to the carrier line.

In another aspect of the invention, the wrapping material is biodegradable.

In another aspect of the invention, the wrapping material is made from jute, sisal, bamboo, or a combination of these.

In another aspect of the invention, the root material is of the genus *Rubus*.

In another aspect of the invention, the method of planting the root material also includes the steps of shaping the soil to receive the root rope and covering the root rope with soil.

Another aspect of the invention provides a root rope for planting root material. The root rope includes root material and a wrapping material. The wrapping material is wrapped around the root material to form an elongate rope.

Another aspect of the invention provides a method of making a root rope. The method includes the steps of providing a root material and wrapping the root material in a wrapping material to form an elongate rope. In another aspect of the invention, the method also includes the steps of providing a carrier line and disposing the root material onto the carrier line, wherein the wrapping material is wrapped around the carrier line and root material to secure the root material to the carrier line.

BRIEF DESCRIPTION OF THE DRAWINGS

FIG. 4 shows a top view of the conveyor shown in FIG. 4.

FIG. 5 shows a side view of the conveyor shown in FIG. 4.

FIG. 6 shows a perspective view of one embodiment of a winding apparatus of the present invention, viewed from the side into which the carrier line and attached root material are fed into the apparatus (henceforth, the "front").

DETAILED DESCRIPTION OF THE INVENTION

Figure 1:
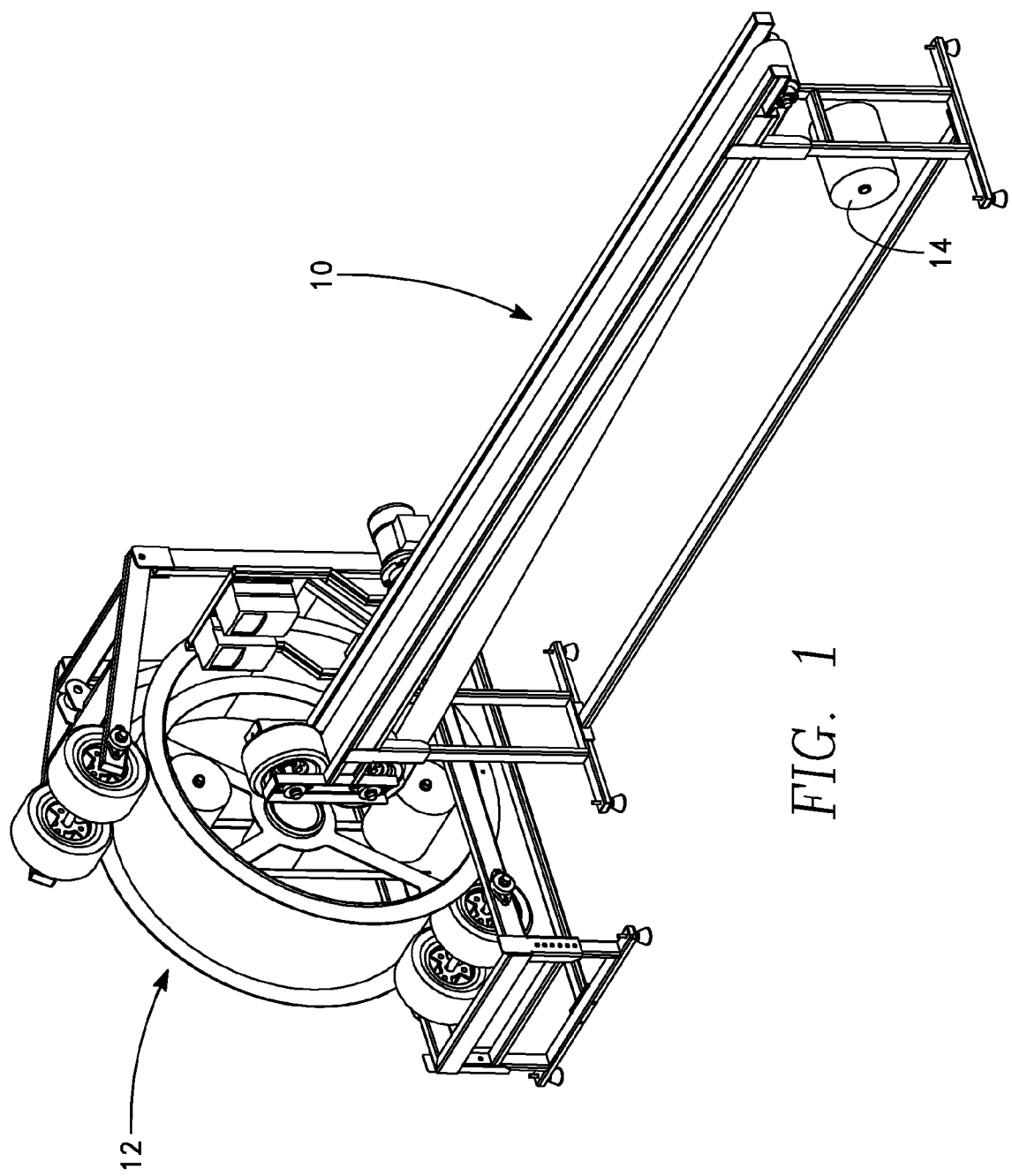
FIG. 1 shows a perspective view of one embodiment of a conveyor and winding apparatus of the present invention.

Embodiments of the presently disclosed method and apparatus reduce costs and time associated with the preparation of plant beds and planting raspberry plants or other plants producing suckers, runners, and the like. The planting methodologies developed through use of this invention have application across the full spectrum of plant and fruit production, including commercial growers, nursery operations, and retail or wholesale outlets which sell plants to the hobby farm and the gardening/home improvement market. While the discussion below refers specifically to raspberries, it is contemplated that the principles of the present invention are applicable to any suitable plant.

Due to the fibrous nature of raspberry roots it is possible to weave the roots into a "rope" configuration, where the roots are preferably disposed onto a carrier line. The carrier line and attached roots are fed through a winding apparatus which wraps one or more wrapping members around the roots/carrier line, to form the rope configuration. The carrier line and wrapping member(s) are preferably fabricated from biodegradable organic materials, (e.g., sisal, jute and bamboo) which will breakdown quickly once placed in the microbial soil environment so as not to impede the harvest process later in the season.

The roping machine apparatus utilized in the present invention includes a feed conveyor, a winding apparatus for winding wrapping material around the roots, and a reeling apparatus for winding the root rope onto a reel. The feed conveyor and winding apparatus may be synchronized together such that the conveyor and winding apparatus are in operation at the same time. The reeling apparatus takes up root rope as it is dispensed from the winding apparatus, with slight tension maintained on the root rope. Root rope is guided onto the reel for uniform distribution on the reel. Once wound on a reel, the root rope is placed into cold storage until ready to be planted.

The feed conveyor will typically be placed alongside a work surface containing root material, either fresh from the field, or taken from cold storage. The carrier line is preferably axially disposed above the feed conveyor, such that workers may manually place root material on the carrier line as it passes along above the conveyor. An acceptable size for the feed conveyor is six inches wide and twelve feet long, which provides sufficient space for workers to work to attach root material to the carrier line. Although in the embodiments of the invention described herein the root material is preferably hand-disposed onto a carrier line, it is contemplated that automated methods of disposing the root material onto the carrier line may be utilized. Further, in some embodiments of the invention, the carrier line may be omitted, with the root material being contained within the wrapping material without first being disposed onto a carrier.

The carrier line and attached root material are fed into the winding apparatus. As the carrier line and the root material attached to the carrier line are fed through the winding apparatus, wrapping material (the "wrapping twine") is wrapped around the carrier line and root material to secure the root material, forming the root rope. One embodiment of the winding apparatus includes a winding drum having a center axial opening, a support frame, rotation means, a wrapping material source for providing the wrapping material, and rotation means for rotating the winding drum. The root rope is axially dispensed from the winding apparatus and spooled onto a reel attached to the reeling apparatus, with the root rope guided onto the reel. Full reels are wrapped in plastic bags and placed into cardboard boxes, then transported to cold storage, where the root rope is stored until required for planting.

When required for planting, the rope storage reels are attached to bedshaping equipment modified to accept the rope storage reels. The rope is fed into the bed by being spooled off of the storage reel, and guided into the proper bed location by an adjustable injection tool. Correct density and correct plant location are controlled respectively by using the proper root mass density during the roping process, and proper placement of the rope during the bedshaping process. At harvest, the root from the plants are reclaimed and the process repeated.

In utilizing the method disclosed herein, substantial savings will be realized from the reduction in the size of the planting crew. The utilization of the root rope eliminates the manual labor steps of sorting, separating, and planting the root material. A significant time savings, which is critical in a short growing season, can be achieved with root rope when compared to hand planting.

Figure 2:
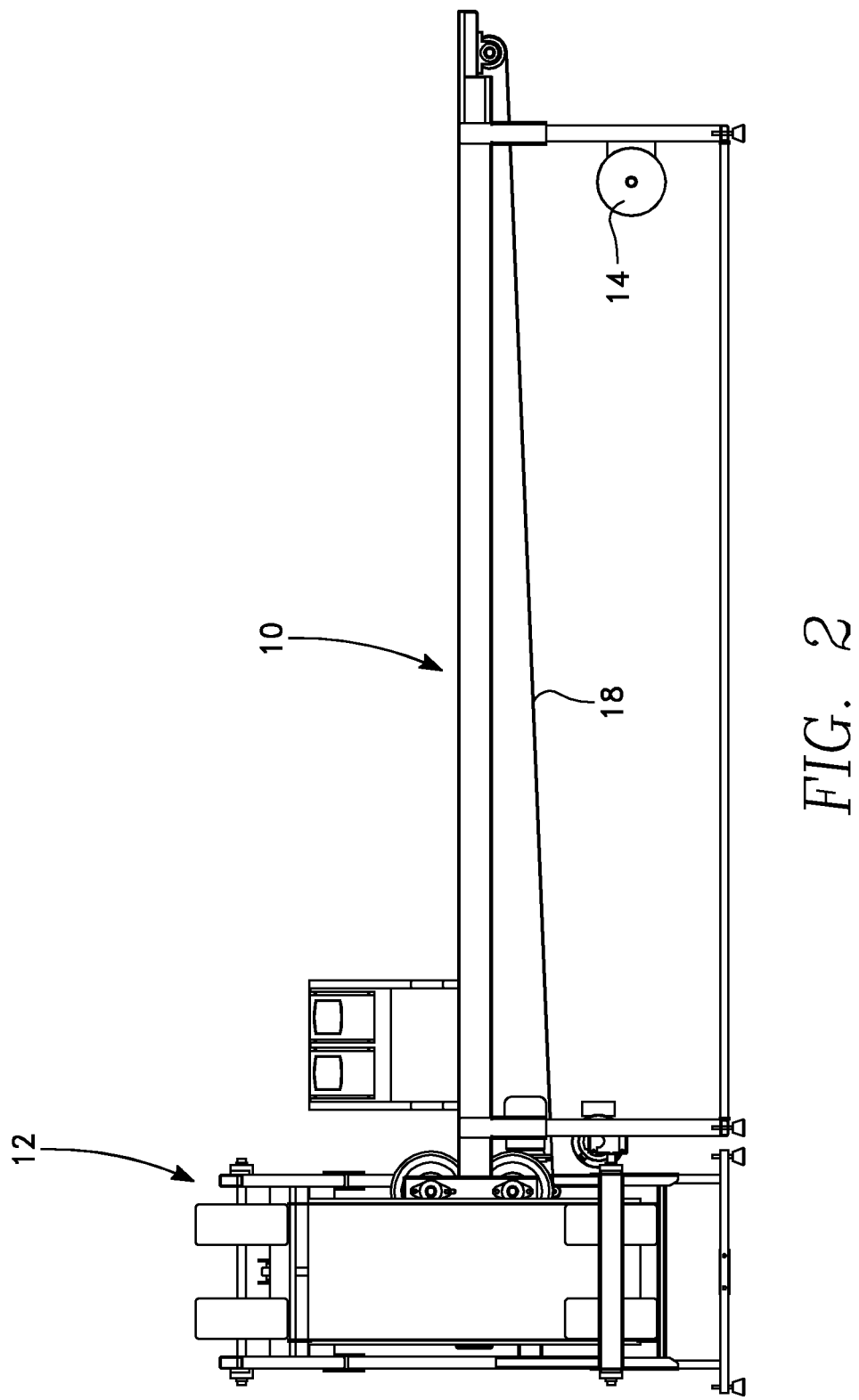
FIG. 2 shows a side view of the conveyor and winding apparatus shown in FIG. 1.
Figure 3:
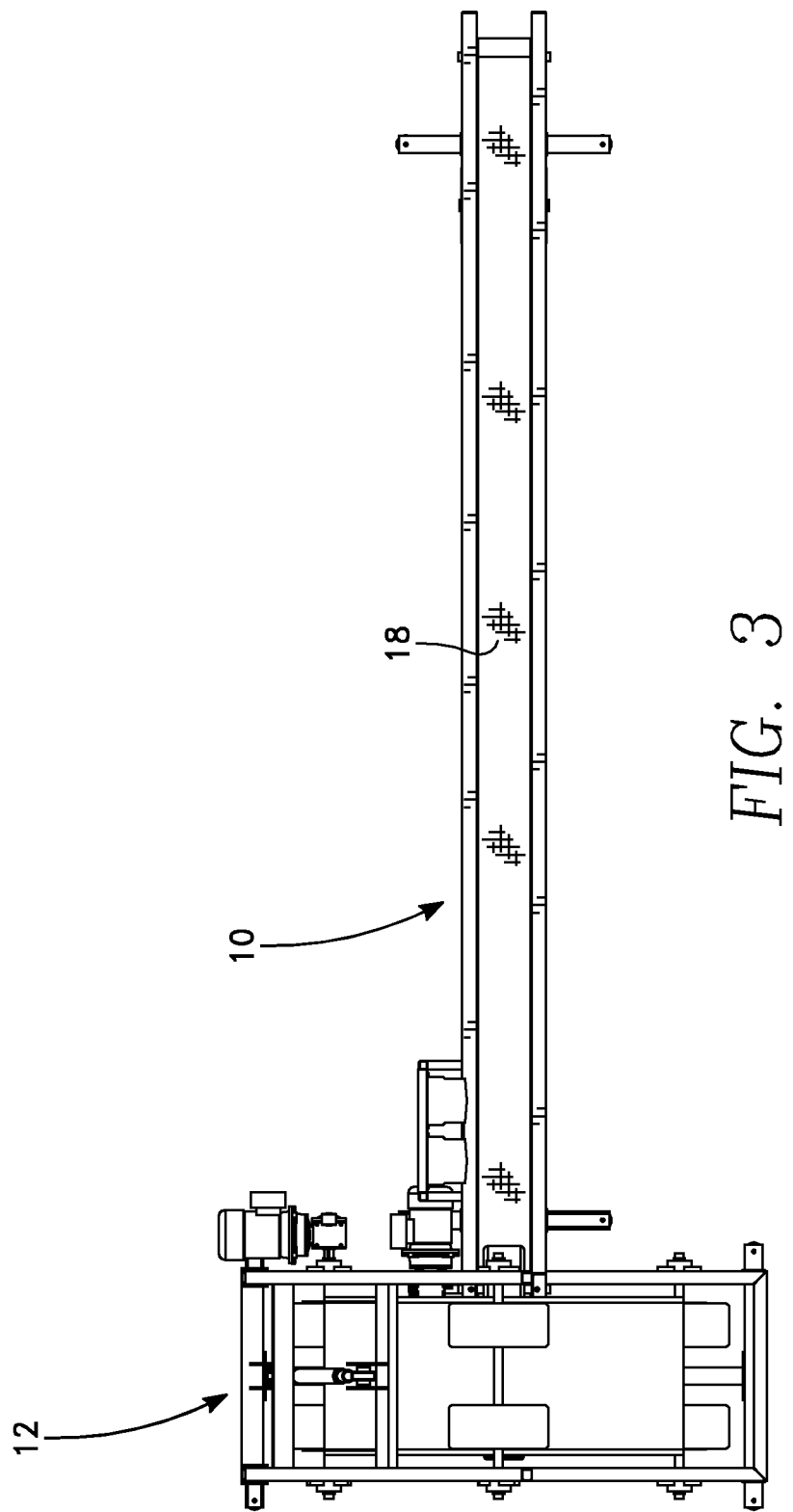
FIG. 3 shows a top view of the conveyor and winding apparatus shown in FIG. 1.

FIGS. 1 through 19 depict exemplary embodiments of the present invention, or of various components thereof. FIGS. 1 through 5 depict an embodiment of a feed conveyor 10 which feeds into winding apparatus 12 in some embodiments of the present invention. FIG. 1, for example, shows a perspective view of one embodiment of a conveyor and winding apparatus of the present invention. A carrier line supply, such as spool 14 may provide carrier line 16 (not shown), which is preferably suspended above a transport path defined by continuous belt 18. Root material is preferably hand placed on carrier line 16, and the combination of root material and carrier line 16 is fed into the winding apparatus 12. FIG. 2 illustrates a side view of the conveyor 10 and winding apparatus 12 of FIG. 1. FIG. 3 provides a top view of the same, while FIG. 4 provides a bottom view of conveyor 10, alone. FIG. 5 is a side view of conveyor 10.

As best shown in FIGS. 2 and 5, feed conveyor 10 comprises a continuous belt 18 which extends between idler roller 19 and is powered by a drive roller 21, which is driven by a motor 23. A work surface, such as a table, counter, or the like (not shown), is preferably disposed adjacent to feed conveyor 10, where root material is placed on the work surface for easy access by workers, who deposit the root material onto the carrier line 16.

Figure 7:
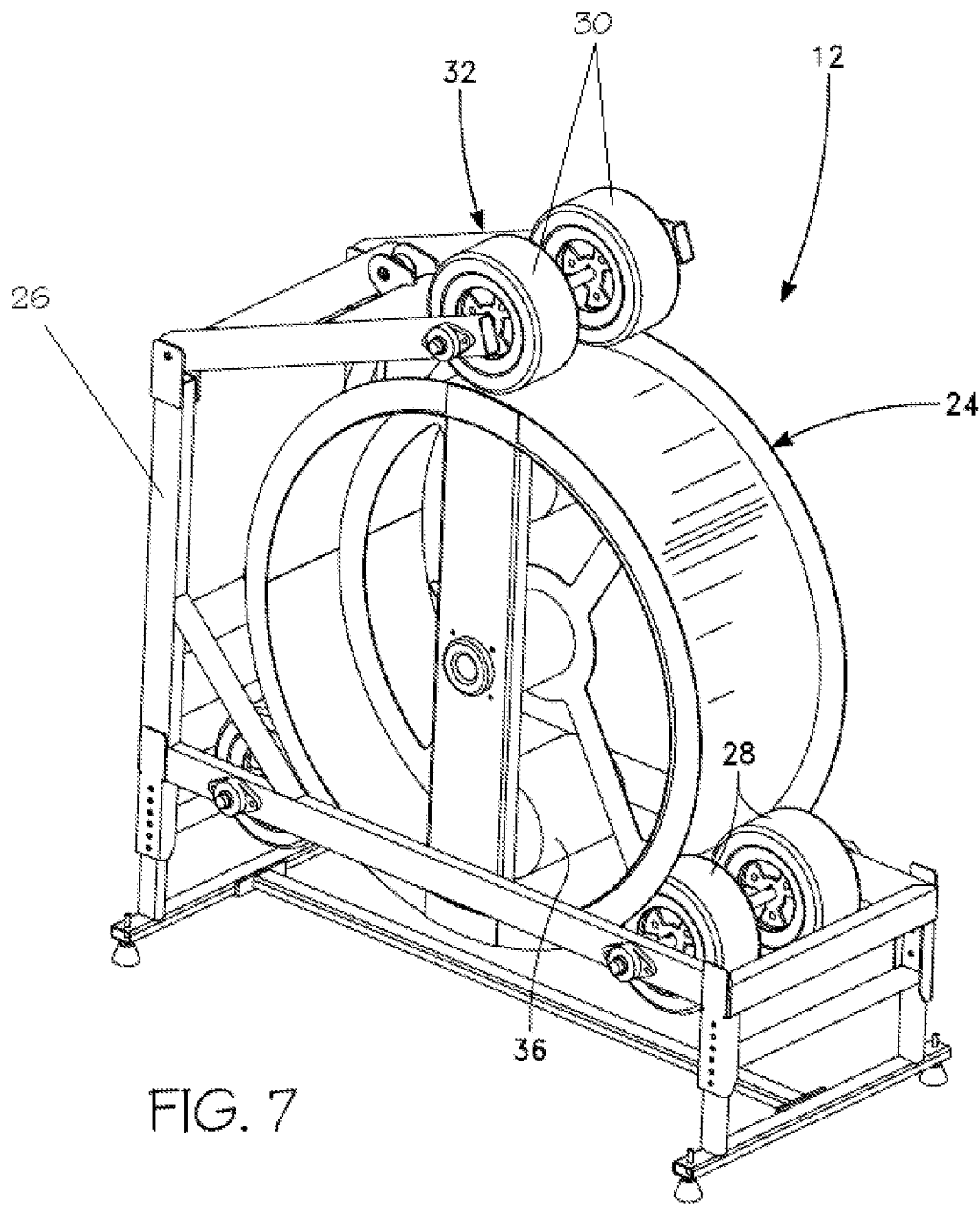
FIG. 7 shows a perspective view of one embodiment of a winding apparatus, viewed from the side from which completed root rope is dispensed (henceforth, the "rear").

Exemplary embodiments of winding apparatus 12 are shown in greater detail in FIGS. 6 through 10. As shown in FIG. 6, winding apparatus 12 preferably includes a drive motor 20 which is mechanically linked to a drive wheel assembly 22. Drive wheel assembly 22 rotates drum 24, which is cradled within frame 26. As seen in FIG. 7, frame 26 comprises lower idler wheel assembly 28 and upper idler wheel assembly 30, both which retain and guide drive wheel assembly 22 within frame 26. Lower idler wheel assembly 28 may be located on the opposite side of frame 26 from drive wheel assembly 22. Upper idler wheel assembly 30 may be disposed on a pivoting arm assembly 32 which is biased downwardly by tension member 34. Winding apparatus 12 further preferably includes wrapping material spools 36 which provide wrapping material to the root rope as the drum 24 is rotated.

Figure 8:
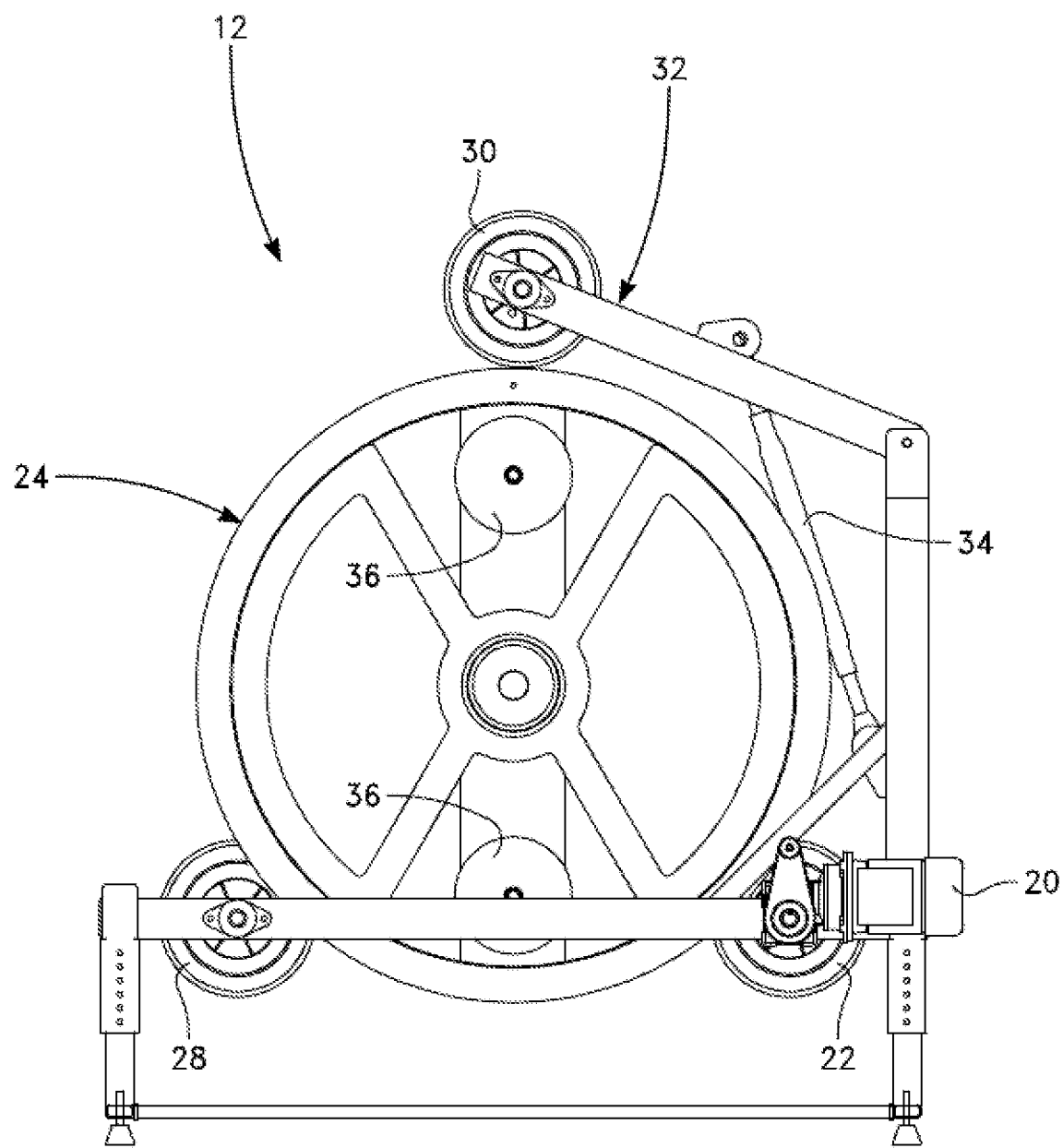
FIG. 8 shows a front view of one embodiment of a winding apparatus of the present invention.
Figure 9:
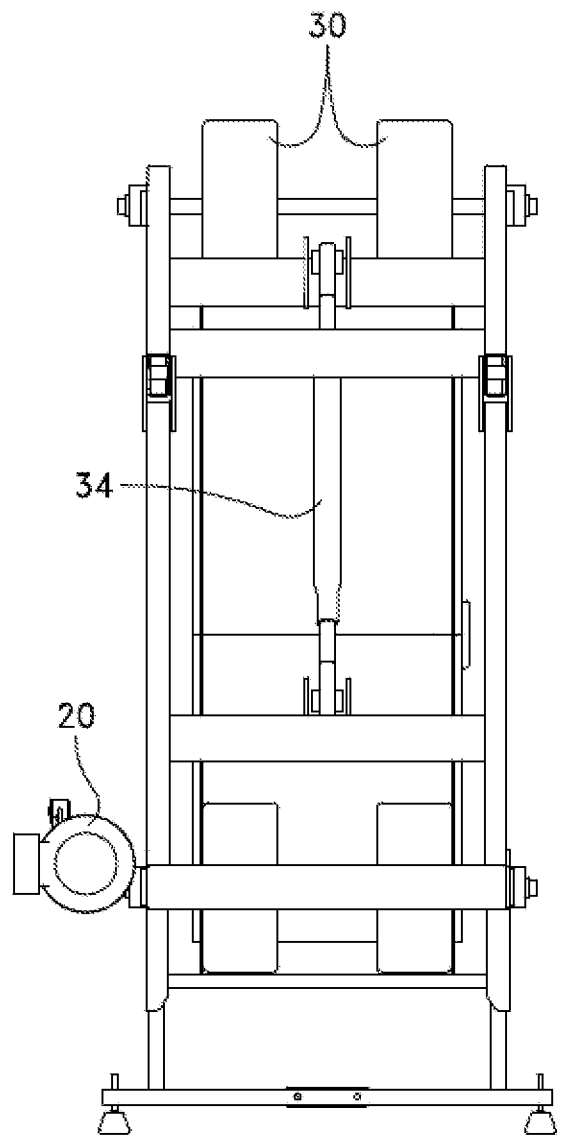
FIG. 9 shows a side view of one embodiment of a winding apparatus of the present invention.

FIG. 8 shows a side view of winding apparatus 12, and the relative positions of upper idler wheel assembly 30, lower idler wheel assembly 28, and drive wheel assembly 22 in this embodiment of the invention are clearly shown. It should be noted, however, that any suitable means of rotating drum 24 may be employed. FIG. 9 provides a side view of the same embodiment of winding apparatus 12 shown in FIG. 8.

Figure 10:
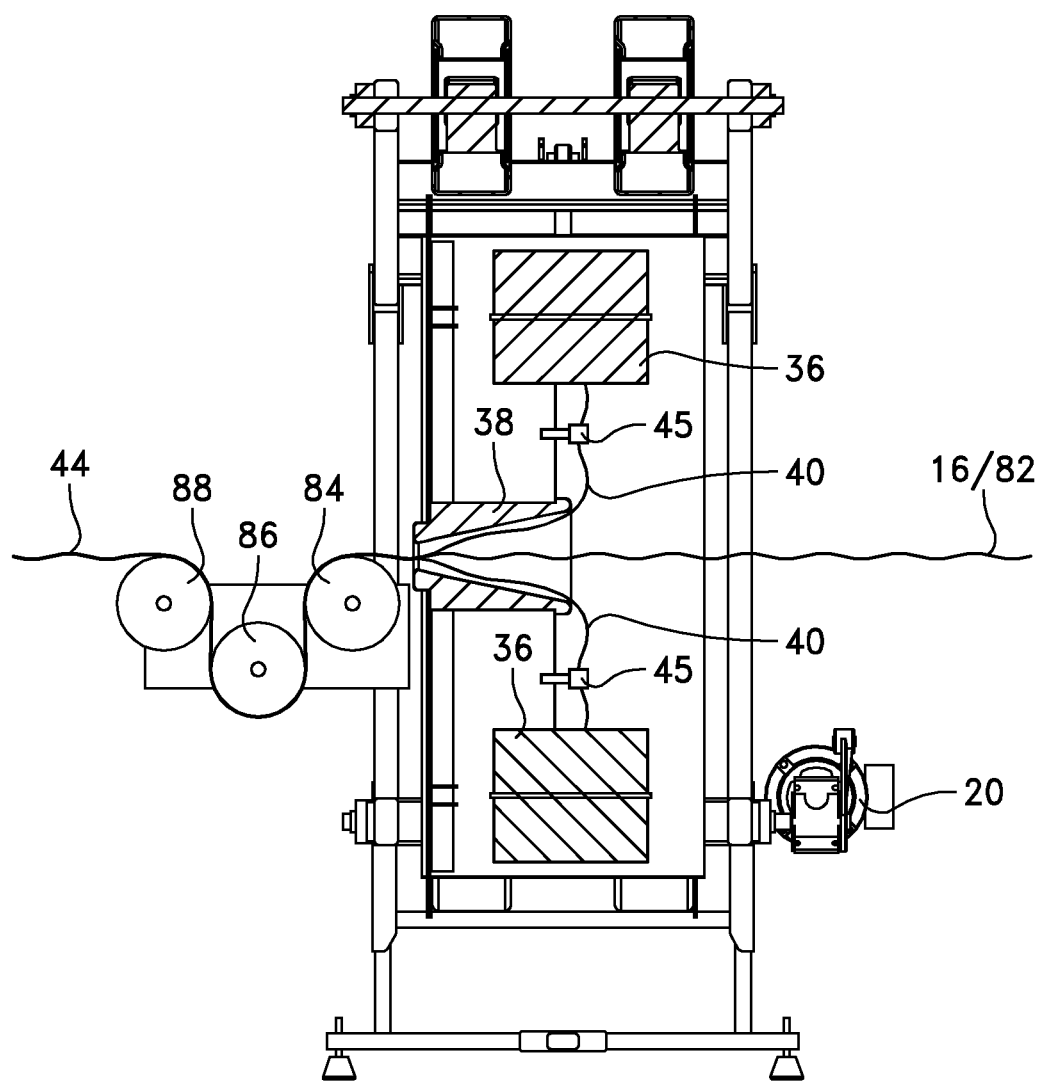
FIG. 10 shows a sectional view of one embodiment of a winding apparatus of the present invention.
Figure 11:
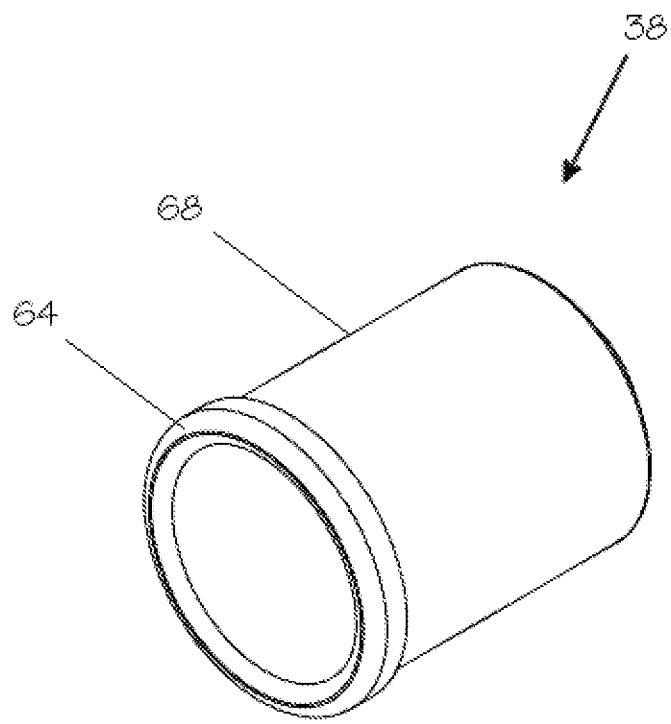
FIG. 11 shows a front perspective view of one embodiment of a funnel that is utilized in one embodiment of the winding apparatus of the present invention.
Figure 12:
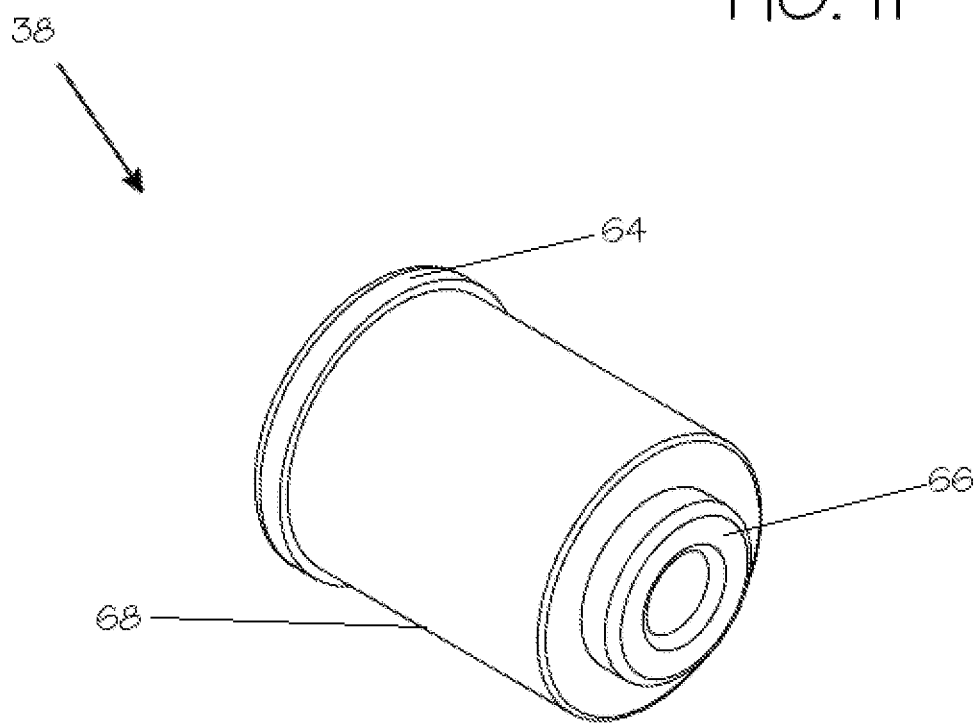
FIG. 12 shows a rear perspective view of an embodiment of a funnel that is utilized in an embodiment of the winding apparatus.
Figure 13:
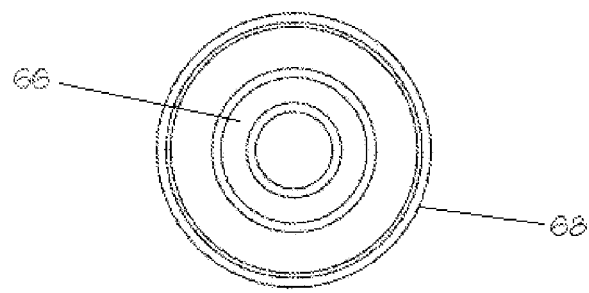
FIG. 13 is a front view of the funnel depicted in FIG. 11.
Figure 14:
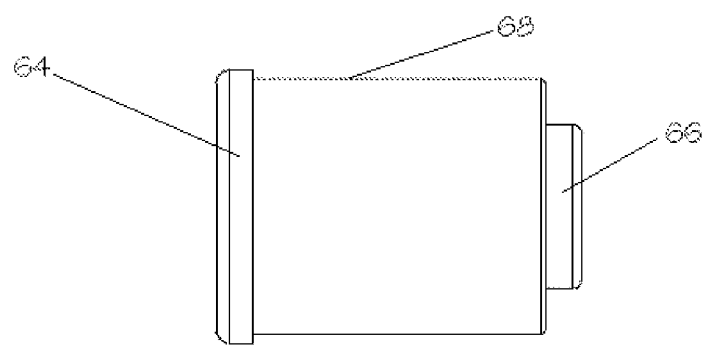
FIG. 14 is a side view of the funnel depicted in FIG. 11.
Figure 15:
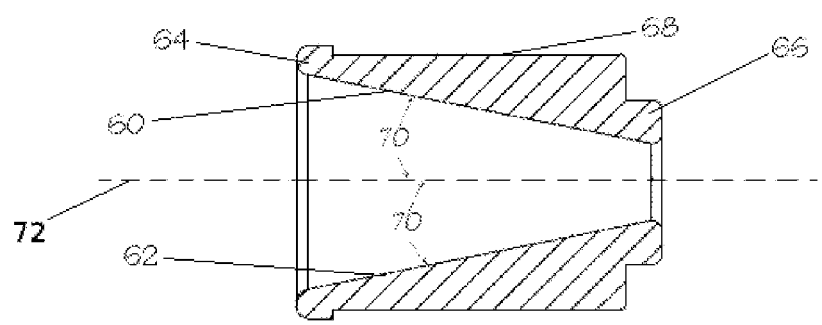
FIG. 15 is a sectional view of the funnel shown in FIG. 11.

As shown in FIG. 10, drum 24 preferably comprises a funnel member 38, into which the combination of root material and carrier line 16 are drawn, entering the larger diameter opening. As root material 82 and carrier line 16 are drawn into funnel member 38, wrapping material 40 (not shown) is applied by rotation of drum 24. Wrapping material 40 is preferably in the form of two strands of material wound onto or around the root material 82 and carrier line 16 from opposing directions. The wrapping material 40 preferably passes through tension eyelets 45, which guide the wrapping material 40 and maintain the required tension in the wrapping material. Finished root rope 44 is dispensed from the smaller diameter opening of funnel member 38 as shown in FIG. 14. Wrapping material 40 is preferably spooled off of wrapping spine spools 36 as the drum 24 rotates. Tension of the completed root rope 44 is preferably regulated as the rope emerges from funnel 38. Root rope 44 preferably passes through a series of pulleys 84, 86, and 88, that serve to regulate the tension of root rope 40 and to provide feedback to reel 52 if the tension is too great or not great enough. Pulley 86 is preferably the load cell that measures the tension on root rope 44. Feedback is provided to a motor controller that adjusts the rotational speed of reel 52 based on the measured tension of root rope 44. If the tension of root rope 44 is too low, the rate of rotation of reel 52 is increased. Conversely, if the measured tension of root rope 44 is too high, the rate of rotation of reel 52 decreases.

While it is preferred that pulleys 84, 86, and 88 are used to measure, regulate, and adjust the tension of root rope 44, it is contemplated that the present device may be utilized without these pulleys. A user of the present device may seek to maintain a more or less constant tension of root rope 44 solely through a set rotational speed of reel 52, and when tension has to be adjusted the user may, for example, adjust the rotational speed of reel 52 based on manual observation of root rope 44 as it leaves funnel 38.

FIGS. 11 through 15 show an exemplary embodiment of a funnel member.

Example

Funnel Member

An exemplary embodiment of funnel member 38 of the present invention is now described. It is to be understood that the dimensions of exemplary funnel member 38 provided here are exemplary and provided for purposes of illustration, and should not be considered limiting. Any suitable size of shape of funnel member 38 may be used.

An exemplary funnel member 38, as shown in FIGS. 11 through 15, includes a generally cylindrical body 68 that is about eight inches in length. Flanges 64 and 66 of about one inch in width each are provided at either end of funnel member 38. Thus, the overall length of exemplary funnel member 38 is about ten inches. Openings are defined at either end of the funnel member 38. At one end, a smaller opening is defined, preferably being about one inch in diameter. At the other end of funnel member 38, a larger opening is defined, the larger opening preferably being about six inches in diameter. Interior walls 60 and 62, shown in FIG. 15, extend between the smaller opening and the larger opening, the interior walls preferably slanting at about an 11.3° angle 70 from an imaginary longitudinal axis 72 drawn through the center of funnel member 38 and extending across the length thereof. Flange 64 at the end of funnel member 38 having the larger opening preferably extends slightly beyond body 68, giving that end of funnel member 38 an overall diameter of about seven and a half inches. Flange 66 at the end of funnel member 38 having the smaller opening is preferably set in from the edges of body 68, giving that end of funnel member 38 a diameter of about four and a half inches. It is contemplated that the dimensions provided herein apply to one exemplary embodiment of funnel member 38, and that any suitable size or shape of funnel member 38 may be used without departing from the spirit or scope of the present invention.

Figure 16:
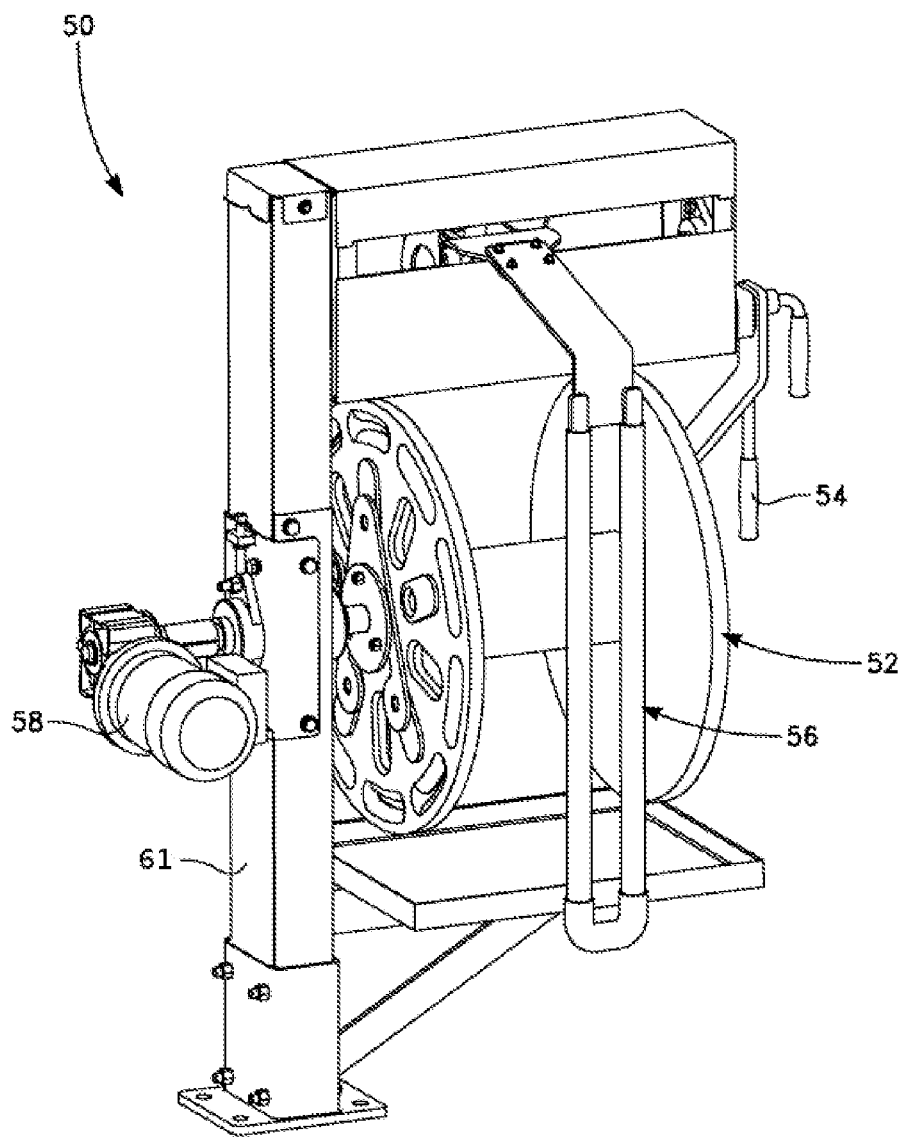
FIG. 16 shows one embodiment of a reeling apparatus of the present invention which may be utilized with the present invention, the reeling apparatus including a guide assembly.
Figure 17:
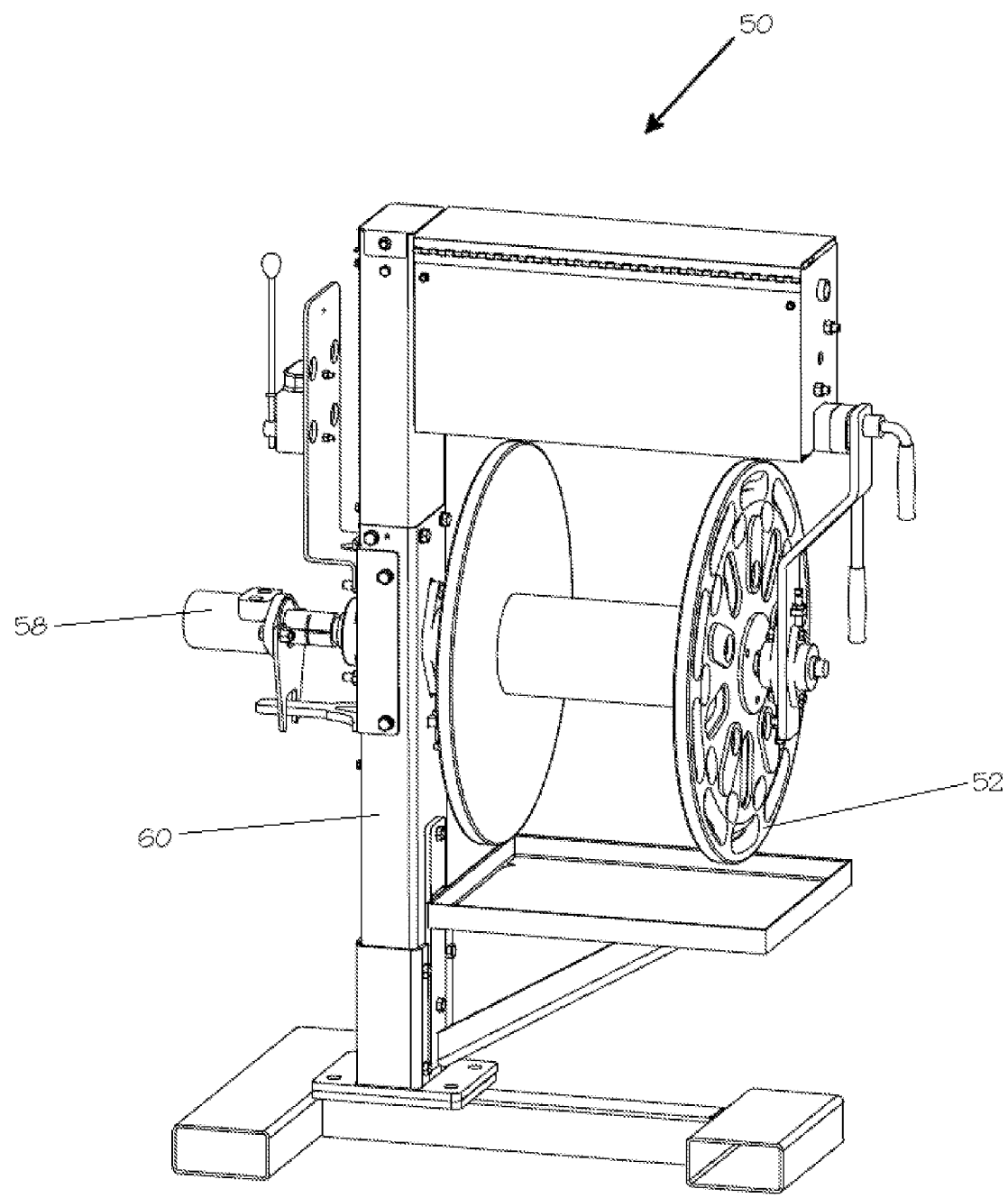
FIG. 17 shows an alternative embodiment of a reeling apparatus of the present invention.

Once the finished root rope 44 is dispensed from the winding apparatus 12, it is preferably pulled by a reeling apparatus 50. Exemplary embodiments of a reeling apparatus are depicted in FIGS. 16 and 17. Reeling apparatus 50 preferably includes a reel 52 which is suspended between a locking arm 54 and a support column 61. The reeling apparatus 50 comprises a motor 58 (either electric or hydraulic) which rotates reel 52 to take up finished root rope 44 (not shown) dispensed from the winding apparatus 12. A slight tension is maintained on the finished root rope. Some embodiments of reeling apparatus 50 comprise a guide assembly 56 which guides finished root rope 44 onto the reel 52 by laterally traversing back and forth along the axial length of the reel such that the rope is evenly wound across the width of the reel. An exemplary embodiment of a reeling apparatus 50 having a guide assembly 56 is shown in FIG. 16.

Figure 18:
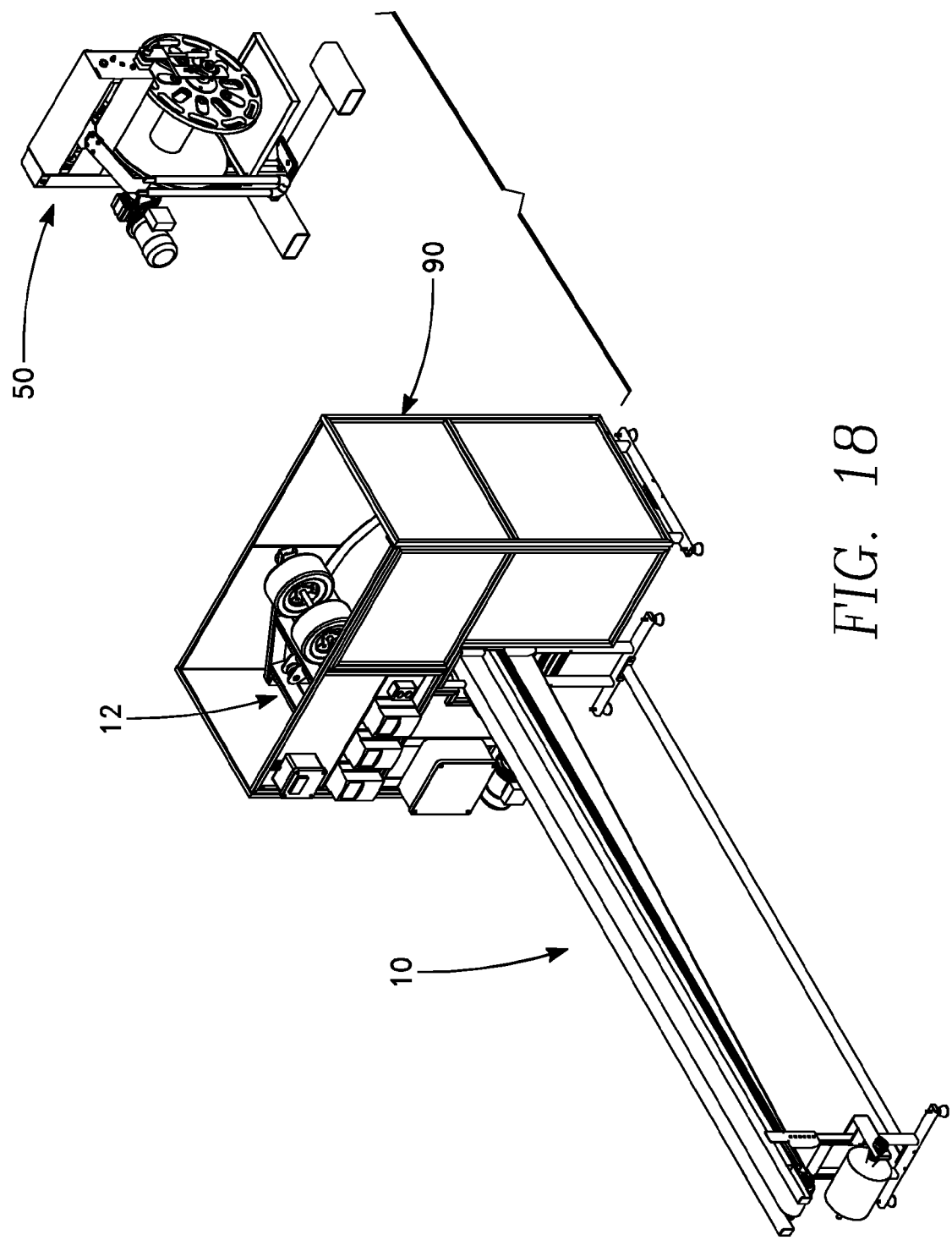
FIG. 18 shows the relative disposition of a conveyor, winding apparatus, and reeling apparatus in one embodiment of the present invention.

FIG. 18 depicts the relative disposition of components of an exemplary root rope assembly and reeling system of the present invention. As shown in the figure, conveyor 10 is preferably located in proximity to winding apparatus 12, which winds the wrapping material around the root material and carrier line to form a completed root rope. Reeling apparatus 50 is preferably further removed from conveyor 10 and winding apparatus 12 and maintains a constant tension on the finished root rope as it is being reeled. It is contemplated, however, that any suitable disposition of the various components of the present invention may be employed. FIG. 18 also shows an exemplary shield 90 that may be associated with some embodiments of the present invention. Shield 90 encloses a space around winding apparatus 12, ensuring that the space is kept free of debris and also preventing harm to workers and others in the vicinity of winding apparatus 12 who may be harmed by the rotational movement thereof.

Figure 19:
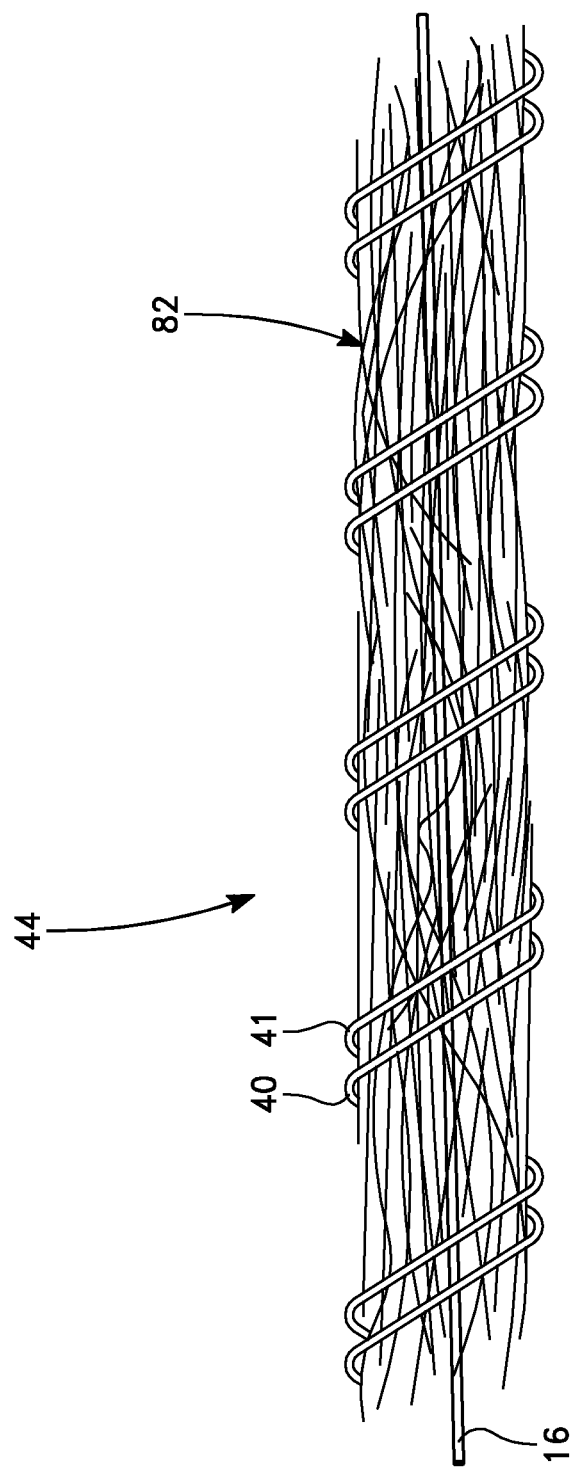
FIG. 19 shows one embodiment of a root rope constructed in accordance with the teachings of the present invention.

FIG. 19 shows an exemplary embodiment of a root rope 44 constructed in accordance with the teachings of the present invention. The root rope includes a carrier line 16 and root material 82 disposed along carrier line 16. At least one wrapping line or length of wrapping material 40 is also included. A second wrapping material 41 is also preferably provided, though it is contemplated that a single wrapping material, or more than two wrapping materials, may be used so long as root material 82 is secured to carrier line 16.

Carrier line 16 and wrapping materials 40 and 41 are preferably produced from biodegradable organic materials such as jute, sisal, bamboo, or combinations of these. It should be noted that the first wrapping material 40 and the second wrapping material 41 may be composed of the same material. The use of two element numbers herein to refer to two separate lengths of wrapping material does not necessarily indicate different composition, though wrapping materials of differing composition may be used if desired.

While the above is a description of various embodiments of the present invention, further modifications may be employed without departing from the spirit and scope of the present invention. It is contemplated that such modifications will be readily apparent to those of ordinary skill in the art upon reading this disclosure. Thus the scope of the invention should not be limited according to these factors, but according to the claims, below.

Having thus described the preferred embodiment of the invention, what is claimed as new and desired to be protected by Letters Patent includes the following:

1. A method for planting root material, the method comprising the step of:
  disposing onto a bed of soil a root rope, the root rope comprising:
    root material disposed onto a carrier line; and
    wrapping material wrapped around the root material and carrier line, securing the root material to the carrier line,
  the wrapping material, root material, and carrier line forming an elongate rope of root material.

* * * * *